(12) United States Patent
Huenefeld

(10) Patent No.: US 7,533,482 B2
(45) Date of Patent: May 19, 2009

(54) METAL EAR TAG WITH ELECTRONIC IDENTIFICATION DEVICE

(76) Inventor: James Allen Huenefeld, 39 Kathy Ave., Ft. Thomas, KY (US) 41071

( * ) Notice: Subject to any disclaimer, the term of this patent is extended or adjusted under 35 U.S.C. 154(b) by 0 days.

(21) Appl. No.: 11/729,533

(22) Filed: Mar. 29, 2007

(65) Prior Publication Data

US 2008/0236001 A1  Oct. 2, 2008

(51) Int. Cl.
*G09F 3/00* (2006.01)
(52) U.S. Cl. .......................... 40/301; 119/858; 119/859
(58) Field of Classification Search .................. 40/301, 40/302; 119/858, 859, 655; 283/75
See application file for complete search history.

(56) References Cited

U.S. PATENT DOCUMENTS

| 2,080,852 | A | * | 5/1937 | Haas | 40/302 |
| 2,086,518 | A | * | 7/1937 | Ashton et al. | 40/302 |
| 2,149,411 | A | * | 3/1939 | Ashton | 40/302 |
| 2,309,030 | A | * | 1/1943 | Wittlinger | 40/302 |
| 2,673,412 | A | * | 3/1954 | Ashton | 40/302 |
| 3,346,980 | A | * | 10/1967 | Wallace | 40/302 |
| 5,461,807 | A | * | 10/1995 | Johnson | 40/301 |
| 6,098,324 | A | * | 8/2000 | Nepote | 40/301 |
| 2004/0103568 | A1 | * | 6/2004 | Steinfort et al. | 40/301 |
| 2006/0010661 | A1 | * | 1/2006 | Murphy | 24/545 |
| 2007/0159332 | A1 | * | 7/2007 | Koblasz | 340/572.1 |

* cited by examiner

*Primary Examiner*—Gary C Hoge
(74) *Attorney, Agent, or Firm*—R. Christian Macke

(57) ABSTRACT

An electronic animal identification ear tag. A self powered transponder is encased in a plastic housing, and the housing is affixed to a one piece metal ear clip. The ear clip has self clinching provisions that are metal only, and the housing has a bubble opening therein to accommodate the closure of the self clinching means. The self clinching locking means and, in a first embodiment, a retaining tooth formed on a leg of said metal ear clip maintain the position of the sleeve on said metal ear clip. In the first embodiment, the housing is a sleeve sliding onto the metal ear clip, while a second embodiment has the housing formed and molded around the metal ear clip.

4 Claims, 2 Drawing Sheets

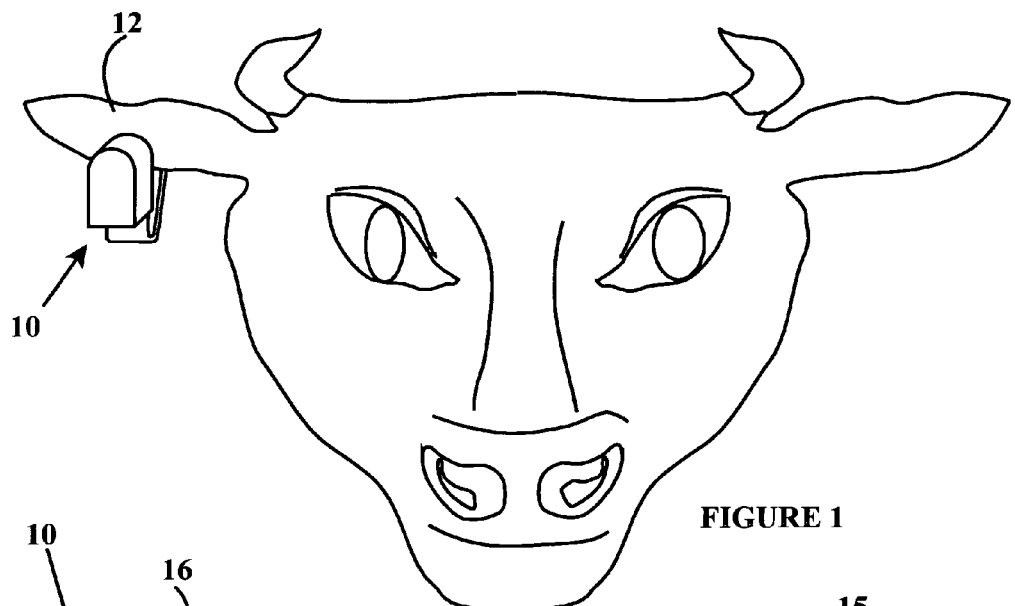
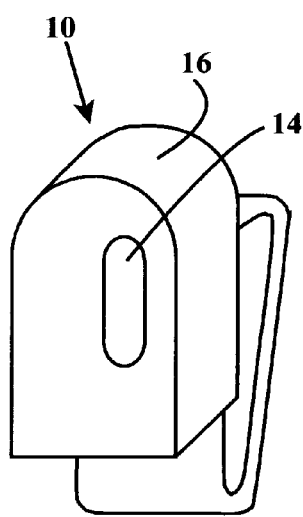
FIGURE 2
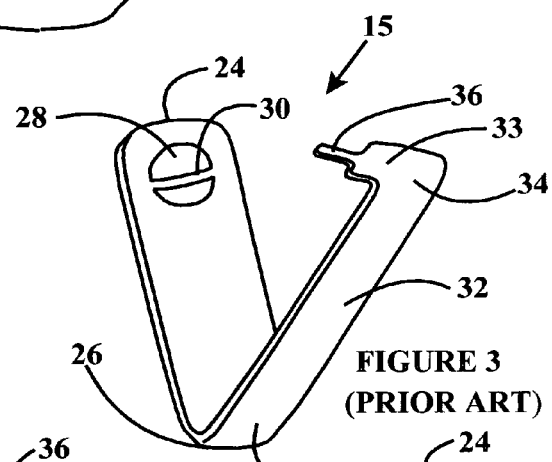
FIGURE 3
(PRIOR ART)
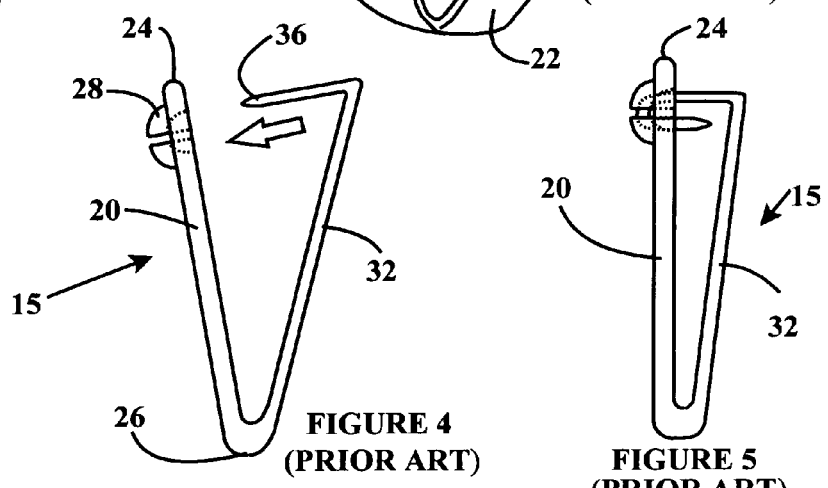
FIGURE 4
(PRIOR ART)
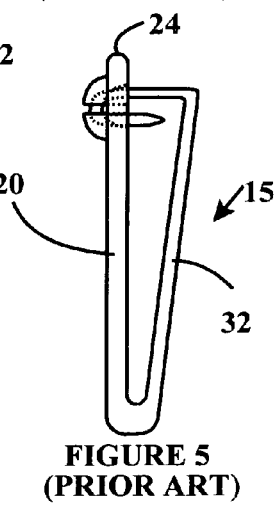
FIGURE 5
(PRIOR ART)

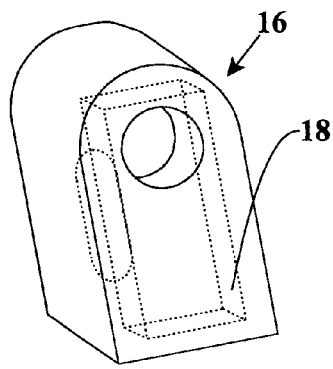
FIGURE 6
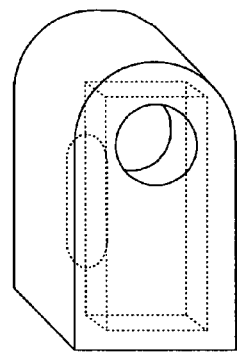
FIGURE 7
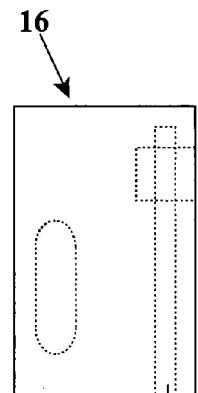
FIGURE 8
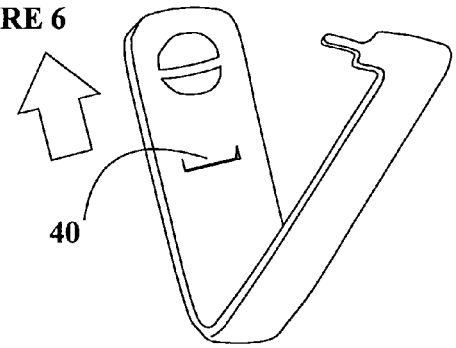
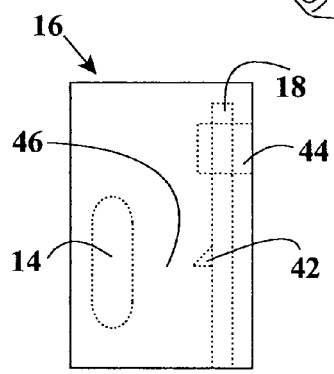
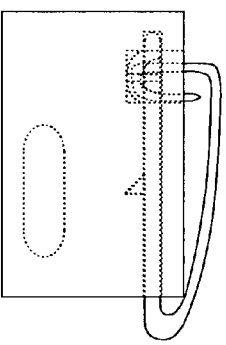
FIGURE 10
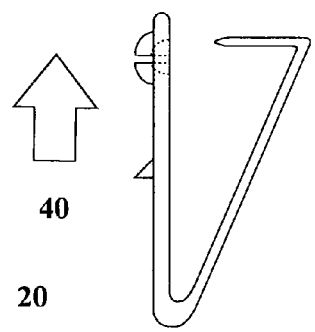
FIGURE 9
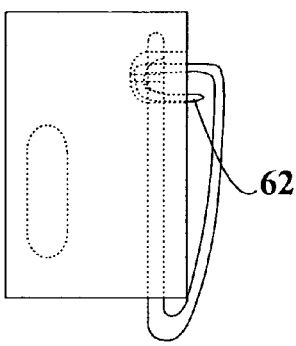
FIGURE 11
FIGURE 12

METAL EAR TAG WITH ELECTRONIC IDENTIFICATION DEVICE

FIELD OF THE INVENTION

This invention relates to an electronic animal identification device and in particular to an electronic animal identification device that is constructed and arranged to be attached to an animal with a metal ear tag. The invention also relates to a method for attaching an electronic identification device to the ear of an animal.

BACKGROUND OF THE INVENTION

Modern farming techniques require careful and accurate control of livestock, including the ability to distinguish individual animals. Livestock ear or identification tags have been commonly used to identify livestock for centuries. There are a great number of prior art devices which have been used in the past to secure an identification tag to livestock. The use of identification tags has contributed to vast improvements in efficiency in agricultural industries, as well as improved safety and lower costs to consumers because disease and genetic mutations are more easily identified with each improvement in the tracking of livestock.

For many years, the identification of livestock was done with "human readable" methods and devices, including branding (i.e. burning an insignia onto the animal) or by attaching simply numbered or colored tags or clips to livestock, for example, the ears of cattle. The data obtained by such methods is useful, but very limited, often identifying just the source or owner and having no information specific to the individual animal, and what limited data exists is difficult to enter or organize into a database. Among the devices and methods used to identify cattle are self clinching metal identification tags such as that disclosed in U.S. Pat. No. 2,087,295.

With specific reference to the use of ear tags for identification of cattle, the means for affixation of the ear tag has evolved greatly, from one piece metal tags with many different forms of affixation to the most common design for ear tags today, the two-piece plastic tag assembly. The two piece assembly typically includes a first piece comprising an ear tag panel having indicia thereon for identifying the particular animal, and a second piece comprising a securing member or securing element which is disposed on the opposite side of the ear and locks the panel in place.

Two piece ear tags constructed from plastic have become the most common kind of tag found in the art due to cost and ease of manufacturing. The ear tag panel and the associated locking device can both be molded at relatively low cost. However, a major disadvantage with the plastic ear tags and locking members is that many of the locking members fail as a result of the nondurable, fragile nature of the molded plastic. Bending stress imposed upon the tag during installation, for example, by the applicator tool (typically a pair of pliers or similar device) can destroy the tag. An example of a prior art two piece ear tag is disclosed at U.S. Pat. No. 4,741,117. A first piece comprising a stud for piercing the ear of an animal, wherein the stud shaft is a hard resilient shaft extending through the ear, has a sharp tip attached at one end. A locking flange is affixed to an opposite end of the stud and prevents withdrawal of the stud from the ear when affixed because of the size of the flange.

Another prior two piece ear tag is disclosed in U.S. Pat. No. 4,209,924. This invention discloses a two-piece ear tag with the first piece being a flat tag containing an identifying indicia. The tag is connected to a retaining price also containing an identifying indicia by a severable section. The retaining piece further includes an anchoring pin or locking member with a sharp tip for piercing the animal's ear and extending into locking engagement with the tag. Another example of a prior art two piece device includes the one shown in U.S. Pat. No. 4,958,452 wherein an ear tag device includes a rivet, a flexible base, a panel for indicia, and an applicator tool. The flexible base allows the rivet and the panel to move forward when mounted through the ear, until the reinforcement tabs bend back to prevent the rivet from being pulled back through the animal's ear.

Most ear tags presently in use are two piece assemblies that include a post extending through the ear and a locking member for mounting and retaining the post in the ear. Typically, the ear tag includes a panel with indicia for providing traditional means of visually identifying the animal. The locking member engages a post extending from the panel for securing both the panel and the locking member to the animal's ear. Therefore, there is a need for an ear tag assembly that is not costly to manufacture and that can withstand the stress of installation.

The evolution of livestock identification devices and methods have also seen the introduction of electronic identification systems incorporated within the traditional tagging methods. For example, today an ear tag may serve two purposes. It may provide a visible, human readable indication by virtue of a distinctive coloring or numbering, and it may also provide electronic identification by virtue of an electronic transponder housed in the ear tag. Electronic identification devices have been developed to provide rapid and automatic identification and remote recording. For example, it is common for an animal ear tag to house an electronic transponder for use in the identification of the animal by a low frequency radio wave reading system. The transponder emits a radio frequency (RF) identification signal that can be read, recorded and stored by a receiver. The farmer using such devices does not have to record information; he merely waves a receiving "wand" next to the animal or has the animal walk through a "gate", where in both cases a large amount of data is transmitted by the transponder and received and recorded by the receiver "wand" or "gate".

In many prior art arrangements the radio frequency identification device (RFID) ear tag is provided with a passive electronic transponder; i.e., no battery power source is provided. The transponder is sealed within an electrically nonconductive plastic ear tag, the transponder consisting of an encapsulated antenna and microchip arrangement. One recent technological advance in the marking or tagging of livestock has been the use of very small transmitters which are retained within the ear tag and which may communicate with a receiver which downloads the electronic information from the transmitter. Transmitters of this type are also equipped with memory chips which may contain a wide array of information on the particular animal. Accordingly, the identification of livestock has advanced so that a vast amount of information may be stored within the memory chip and can be easily downloaded to the receiver. This type of technology has greatly improved the capability to track and maintain records on each animal.

RFID's are commonly utilized for electronically identifying animals or objects. In many applications, the transponder unit is loaded with data and attached to an animal or object which is to be identified. The transponder unit is incorporated into a passive, read only RFID system having an interrogator used along with the transponder. To conserve battery power, the RFID is not continuously transmitting but, instead, only transmits when it is interrogated. The interrogator sends a signal to the transponder which then causes a radio frequency transmission of data from the transponder. The signal sent is identification data pertaining to the object associated with the transponder.

Typically, RFID's use a coil antenna to stimulate the transponder and propagate the signal. Such a coil antenna consists of one or more coils of conductive material provided within a single plane, and is typically a loop antenna. The transponder can also comprise a coil antenna.

An exemplary application of a passive, non-powered RFID system is disclosed for identification of animals in a meat-processing plant. A reason for identifying individual animals in a meat-processing plant is for safety and sterilization reasons, and to improve meat quality and/or farming processes. For example, it is often desirable to track an animal throughout its entire lifetime up to, and including, slaughter to get a full understanding of the factors that influence meat quality. To create a complete record, an RFID transponder tag is placed in an animal's ear at time of birth, and can be utilized to document events occurring within the animal's life. The RFID transponder can, for example, be utilized with interrogators to catalog the feed ingested by the animal, vaccinations provided to the animal, and any growth hormones administered to the animal. Also, the transponder can be used in combination with an interrogator at time of slaughter to analyze and store the meat quality of the animal. Transponders can be utilized to procure and record data pertaining to individual animals of a population, and the data accumulated by the transponders can be studied to correlate the effect, if any, of particular farming practices on meat quality.

In another exemplary use of a RFID in a meat-processing plant, transponders are provided on individual animal bodies within the plant to enable tracking of the bodies during processing to enable, for example, meat products from a particular body to be pulled in the event the body is found to be contaminated or diseased.

A portable hand-held data collecting computer generally referred to as a "wand" may be used to interrogate or scan this eartag by waving it over the animal in sufficiently close proximity to communicate with the RFID. With a wand, the collection and retrieval of animal information can be performed in a barn, corral or field. In addition, interrogation "gates", wherein cattle pass through a gate that reads the electronic data stored on the RFID's, may also be used to collect data.

RFID's fall into two broad classes. Devices which are carried within the animal (either sub-cutaneously or internally) and those which are attached to the animal. Of the latter variety, those attached to the ear of animal are the most prevalent.

The mechanical makeup of ear tags has evolved, from metal clips such as that disclosed in U.S. Pat. No. 2,087,295 to the plastic molded two piece ear tags incorporating electronic identification devices. Notwithstanding this evolution, metal ear tags are still used, typically comprising one piece of stamped metal with a locking closure mechanism incorporated therein. In one specific example, the two ends of an unclosed, stamped metal tag are placed on opposite sides of the animal's ear and pushed together with an applicator tool, similar to a pair of pliers. A first end of the ear tag, comprising a narrow "point", pierces the animal's ear and is bent around a "bridge" formed in the other end to secure them together (see prior art FIGS. 3, 4 and 5). This one piece metal tag exhibits superior retention and ruggedness although until now it has been limited to providing visual, human readable information and has not been combined with electronic identification devices.

The relatively large size of most two piece plastic ear tags is problematic because they become caught on things like baling twine and wire fences, causing damage to or loss of the tag and in many cases, compromising the accuracy or completeness of the accumulated data. For most two piece plastic ear tags, male connector pins for ear tag attachment comprise a round button that seats against the rear of the ear. The pin is pushed through the ear from the button by the applicator tool and engages with the female connector tag held against the front of the ear. When cattle graze near a fence, which is common, the wire of the fence (particularly if it is barb wire, farm fence or any other grid type fencing) can catch on either the tag or the button. As the animal pulls away from the fencing, the ear tag or pin may be damaged or the ear of the animal may be torn. In addition to the probable loss of the ear tag and transponder, infection of the animal's ear often occurs resulting in losses for medical treatment, increased risk for the safety of the animal and the ultimate consumers, and loss of the animal's data. Furthermore, irritation caused by the infection may lead to the animal rubbing the ear, further increasing the likelihood of the tag being lost or damaged. There is thus a compelling need for ear tags to be as small and unobtrusive as possible, while also having reliable, unbreakable means for affixation to the animal and with an electronic identification device incorporated therein.

All of the more recent plastic tags suffer from the disadvantages that plastic is not as rugged or durable as their counterpart metal tags and, as a result, they do not exhibit the same reliability or retention rates.

One prior art example of an ear tag utilizing an electronic tagging means is U.S. Pat. No. 4,718,697. This reference discloses the use of an identification device characterized by a two-piece body portion forming a cavity for storage of an electronic device. An attachment portion connects to the body portion so that the device may be attached to an animal's ear. The device described in U.S. Pat. No. 4,718,697 has the transponder molded in a hard bubble in the middle of rectangular tag. Insofar as the tag hangs from the ear of an animal with the transponder in a position that is susceptible to impact or pressure, the mechanical arrangement of this device does not provide the protection necessary to ensure long-term, damage-free operation of the transponder contained therein.

Another prior art example of an ear tag utilizing an electronic tagging means is U.S. Pat. No. 5,482,008. This reference discloses a use of a bolus which is retained within the reticulum of the animal. An electronic device is housed and sealed within a glass housing of the bolus. Quartz and fiberglass are also mentioned as being suitable for construction of the housing.

U.S. Pat. No. RE 31,940 discloses an identification tag for livestock which mentions within the disclosure the capability to house an electronic device within a portion of the device.

Although the state of animal identification devices has improved, the same general requirements still remain for the use of devices which are attached to an animal's ear. For example, it is desirable to have ear tags which are small, easily installed, minimize damage to the animal's ear, and can withstand the stresses which are placed upon the ear tag by the animal and the environment. With the introduction of electronic transponders, it is desirable to provide ear tags housing the transponder, antenna and other electronic circuitry associated therewith. It is also desirable to provide an ear tag which may be installed by existing ear tag applicators/installers.

An advantage of plastics housings over traditional metal clips is that plastics can be formed around very small transducers, while metal can not. It is much more difficult to handle metal to wrap such a small device to protect it. The present invention has struck the balance between the ruggedness and superior retention of the metal ear tag with the incorporation of the plastic wrapped and metal mounted electronic transponder.

It is thus desirable to combine the new technology of using electronic identification with the old reliable metal clip means for attaching the identification to the ear.

OBJECTS OF THE INVENTION

It is an object of the present invention to provide an electronic identification device for livestock utilizing a one piece closure device that is self clinching.

It is another object of the present invention to provide an electronic identification ear tag having a plastic molded housing secured to a metal clip by being formed around the transponder and the metal clip.

It is another object of the present invention to provide a livestock identification device using a radio frequency transponder encased in a non-interfering housing.

It is yet another object of the present invention to provide a livestock identification device comprising a plastic housing secured to one piece metal ear clip such that the housing does not impede the closure of the ear clip.

It is another object of the present invention to provide an electronic identification device comprising a housing formed around the transponder and metal ear tag with provisions in the housing accommodating the means for closing the metal ear tag.

It is a further object of the present invention to provide a sleeve for encasing an RFID transducer having provisions allowing a one-piece metal ear clip to be secured.

It is a further object of the present invention to provide an electronic transponder for use with cattle wherein the transponder is encased in plastic and secured to a metal clip that is then attached to the ear.

It is yet another object of the present invention to provide a livestock identification device wherein the closure means retaining the device on the ear is entirely metal.

It is another object of the present invention to provide a livestock identification device having provisions for securing and retaining a plastic housing on a one-piece metal clip.

It is yet another object of the present invention to provide a method for securing an electronic identification device to cattle wherein the means for affixing the device is completely made up of metal closure means.

These and other objects and advantages of the present invention will be apparent from a review of the following specification and accompanying drawings.

SUMMARY OF THE INVENTION

The present invention provides an electronic identification tag for use with livestock, most commonly utilized by being attached as an ear tag. A preferred embodiment of the inventive tag has a metal ear clip and a plastic sleeve having an electronic identification device secured in the plastic sleeve. The electronic identification device is a passive radio frequency transducer in the most preferred embodiments of the present invention. In addition, the tag has a means for retaining the plastic sleeve on the metal ear clip.

The tag of the present invention also has means for closing and securing the ear clip built in to the ear clip itself. A preferred embodiment of the electronic identification tag of the present invention includes a plastic sleeve having provisions for accommodating and engaging the closing means. Specifically, the plastic sleeve is provided with a void to allow built in closure means to interlock without cutting or damaging the plastic sleeve. Retaining means for the plastic sleeve are provided comprising a locking device in the plastic sleeve which prevents translation of the plastic sleeve along the ear clip.

In a preferred embodiment of the present invention the ear clip is a one piece stamped and bent metal blank and the closing means are self clinching means. The self clinching means further comprise a stamped bubble and an extended tab formed at the opposed end of the stamped and bent metal blank. A raised bridge is formed within the stamped bubble such that, as the opposed ends of the one piece stamped metal blank are pushed together, the extended tab contacts the bubble, is bent by the force of closure to go under the raised bridge, and doubles back on itself to securely lock the ear clip together. In the preferred embodiment of the present invention, the closing provisions comprise only metal locking elements.

A second preferred embodiment of the present invention comprises an electronic identification tag having a metal ear clip and a plastic housing formed around an electronic transponder. Further, the plastic housing is formed around the metal ear clip. In addition, this preferred embodiment has means for affixing the metal ear clip to an animal, the means for affixing being cooperating metal components. The plastic housing of this preferred embodiment is provided with means for accessing the cooperating metal components. A void is formed in the plastic housing to allow cooperating metal components built into the metal ear clip to interlock without cutting or damaging the plastic housing.

The metal ear clip of the second preferred embodiment comprises one piece of metal having a first end and a second end, and the cooperating metal components are provided by the first end interlocking with the second end. Further, the plastic housing of the second preferred embodiment is formed substantially around the second end of the metal ear clip, and the means for accessing is a void in the plastic housing allowing access to the second end.

In this preferred embodiment, the cooperating metal components are a stamped bubble and an extended tab formed at the opposed end of the stamped and bent metal blank. A raised bridge is formed within the stamped bubble such that, as the opposed ends of the one piece stamped metal blank are pushed together, the extended tab contacts the bubble, is bent by the force of closure to go under the raised bridge, and doubles back on itself to securely lock the ear clip together.

BRIEF DESCRIPTION OF THE DRAWINGS

FIG. 1 is a representation of the plastic sleeve mounted electronic identification device of the present invention affixed as a cattle ear tag.

FIG. 2 is a detail drawing illustrating the ear tag of the present invention as it appears when the self clinching device has been closed.

FIG. 3 is a detailed view of a prior art self clinching ear clip without the electronic identification provisions.

FIG. 4 is a side view of the prior art self clinching ear clip prior to closure thereof.

FIG. 5 is a side view of the prior art self clinching ear clip after closure with the extended tab bent under and wrapped around the bridge.

FIG. 6 is a perspective view of the self clinching ear clip and soft plastic housing sleeve of the present invention indicating the application of the housing to the ear clip.

FIG. 7 is a perspective view of the transponder housing of the present invention illustrating the location of the transponder therein in phantom.

FIG. 8 is a side view of the transponder housing of the present invention illustrating the location of the transponder, ear clip void and means for accessing void therein in phantom.

FIG. 9 is a side view of the open self clinching ear clip and plastic housing of the present invention prior to insertion of the leg of the ear clip into the plastic sleeve.

FIG. 10 is side view of the open self clinching ear clip and plastic sleeve of the present invention after insertion of the leg of the ear clip into the plastic sleeve and after closure of the self clinching means.

FIG. 11 is a side view of the plastic housing molded around the metal ear clip, with the clip open, and an electronic identification transponder.

FIG. 12 is a side view of the plastic housing molded around the metal ear clip, the clip shown closed as it exists after affixation to an animal, and transponder.

DETAILED DESCRIPTION OF THE INVENTION

In accordance with the principles of the present invention, an electronic identification ear tag 10 is provided which, when affixed to the ear 12 of livestock such as cattle, is an accurate, durable and efficient device and method for monitoring and tracking livestock. In the most preferred embodiment of the present invention, the ear tag 10 comprises a transponder that is a radio frequency identification device 14 (RFID), encased in a plastic housing 16. The RFID 14 may take many different forms, such as a disk or a small capsule with a wound antenna, but as long as the RFID 14 is small enough to be encased by the housing 16, the use of the various embodiments of RFID's is contemplated by the principles of the present invention. In illustrated embodiment, the transponder 14 is a capsule shaped transponder with an antenna built in.

The preferred embodiments of the present invention contemplate the use of a passive electronic transponder 14 that does not require a battery or power supply. As is well known in the prior art, RFID's may be provided with piezoelectric crystals which eliminate the need for a power source. The most preferred embodiments of the present invention contemplate the use of an RFID that does not require a battery or other power supply, but to the extent that an RFID with an external power supply fits into the housing 16, such a device is contemplated and does not depart from the principles of the present invention.

The electronic transponder 14 of the present invention is used in conjunction with a receiver comprising a hand wand or gate (not shown) to collect the data being transmitted by the transponder 14. Data is transmitted from the transponder 14 in one of two ways. It is either continuously transmitted, in which case the receiver receives such data whenever it is positioned within sufficient proximity of the receiver for radio frequency communication to take place. Alternatively, the transponder 14 may sit idly until it receives a signal to transmit from the receiver, at which time the transponder 14 transmits its data to the receiver. The preferred embodiments of the present invention contemplate radio frequency communication by the transponder, so the use of various particular polling techniques or protocol is contemplated and does not depart from the principles of the present invention.

The plastic housing 16 has provisions to accommodate attachment to and retention on a metal identification ear clip 15, such as is known in the prior art (see FIGS. 3, 4 and 5). In a first preferred embodiment of the present invention, the plastic housing 16 is formed in the absence of the metal clip 15 as a plastic sleeve 18 that provides a tight fit for one leg 20 of the ear clip 15. In this first embodiment, the housing 16 is attached to and positioned on the ear clip 15 by sliding the leg 20 into the sleeve 18 as shown in FIG. 6. The plastic sleeve 18 is molded from a moderately hard plastic to provide adequate resilience to allow the leg 20 to be pushed into the sleeve, with some resistance. A bubble 28, stamped into one end 24 of the clip 15, will provide frictional resistance as the leg 20 is pushed into the sleeve 18 until it is fully seated and the bubble is positioned in the bubble void 44 formed in the housing 16.

The particular prior art ear clip 15 shown in FIGS. 3, 4 and 5 is shown with a means for self clinching. Specifically, as shown, the ear clip 15 is constructed from one piece of material 22. In the most preferred embodiment of the present invention the ear clip 15 comprises a one piece stamped and bent metal blank. The ear clip 15 also comprises a means for locking onto itself incorporated into the stamped and bent metal blank.

The single piece 22 of material comprising ear clip 15 is stamped and bent into substantially a V-shaped clip as shown in FIGS. 4, 5 and 6. Prior to closure, near one end 24 the leg 20 opposite the vertex 26, a bubble 28 is stamped onto the leg 20. The bubble 28 is a semi-sphere indentation in the leg 20 except that a strip 30 near the middle of the bubble 28 is left undisturbed by the stamping of the leg 20. The strip 30 will function as a raised retaining bridge 30 to hold the ear clip 15 together after closure.

The other leg 32 of the ear clip 15 has a bent extension 33 near the end 34 opposite the vertex 26 such that an extended tab 36 extending from the bent extension 34 substantially lines up with the bubble 30 on the opposite leg 20. The bubble 28, raised bridge 30 and extended tab 36 comprise the means for closing the ear clip 15, as well as a means for self clinching the ear clip 15.

Closure of the prior art ear clip 15 is accomplished by squeezing the legs 20, 32 together, as shown by the arrow in FIG. 4. When squeezed together, by an applicator such as a typical pair of pliers, the extended tab 36 engages the bubble 28 and bends along the curved direction of the bubble 28, and under the raised bridge 30 until the extended tab 36 emerges, bent back and retained as shown in FIG. 5.

In the most preferred embodiments of the present invention the plastic housing 16 has provisions specifically designed to accommodate the closing and self clinching means of the ear clip 15 shown in FIGS. 3, 4 and 5. However, the use of other one-piece metal tags with self clinching devices or built in closure means, and specific provisions in the sleeve 12 to accommodate them, are specifically contemplated and do not depart from the principles of the present invention.

The prior art ear clip 15 is modified in one preferred embodiment of the present invention to provide a locking means comprising a locking tooth 40, which is shown stamped into the leg 20 just below the bubble 28. When the plastic sleeve 16 is slid down over the leg 20, the locking tooth 40 lines up precisely with a locking void 42 in the sleeve 16, as shown in FIG. 10. The cooperative effect of the tooth 40 and void 42 is to prevent translation of the sleeve 16 along the leg 20.

The plastic sleeve 16 is provided with an opening 18 to receive one leg 20 of the one piece metal ear clip 15. The fit of the leg 20 into the opening 18 is intentionally tight to secure the sleeve 16 thereto, and to, along with the locking tooth 40 and void 42, prevent translation of the sleeve 16 on the leg 20. The tight fit of the sleeve 16 makes it difficult to push the sleeve 16 onto the leg 20 over the bubble 28 and locking tooth 42, until it is completely seated and the bubble 28 is positioned in a bubble void 44 and the tooth 40 is positioned in the void 42 formed in the housing 16.

In an important aspect of the present invention, the RFID is encased within the plastic sleeve 16 during formation of the sleeve 16 with a layer 46 of insulating material between the leg 20 and the RFID 14. This electrical isolation provided by insulation layer 46 insulation is critical to ensure proper operation of the RFID.

The bubble void 44 in the housing 16 provides a means for access to the means for closing and means for self clinching built into the ear clip 15, specifically the bubble 28 and raised bridge 30. Thus, the sleeve 16 may be attached to the leg 20 and ear clip 10 by sliding the metal clip 15 into the opening 18, without affecting or impeding the closure of the ear clip 15 by pushing the extended tab 36 into the bubble 28 and around the raised bridge 30.

In another preferred embodiment of the present invention, an ear tag 50 is provided having a housing 52 formed from plastic around a transponder 54 and a one piece metal clip 56. The metal clip 56 has self clinching means 60 comprising an extended tab 62, a stamped bubble 64 and a raised bridge 66. As shown in FIGS. 11 and 12, the metal clip is secured by pushing the extended tab 62 in to engage the bubble 64, which causes the extended tab 62 to be bent under the raised bridge 66 and in a direction back toward itself. The plastic housing 52 accommodates the self clinching means 60 by having a void 58 formed therein to provide access to the self clinching means 60, specifically the bubble 64 and raised bridge 66, without otherwise affecting the integrity of the housing 52. Molding and forming the housing 52 around the transponder 54 and metal clip 56 provides an ear tag with all of the reliability advantages of a one piece metal clip while also providing an electronic identification device securely affixed thereto.

The ear tag 50 is molded and formed to provide a minimum of 0.200 inches of material clearance 68 between the metal clip 56 and the transponder 68. The clearance 68 is necessary and has been found to be adequate through the knowledge, experience and experimentation of the inventors to prevent any radio frequency interference problems caused by the proximity of the metal clip 56 to the transponder 54.

The two embodiments of the present invention are thus accurately represented as a plastic sleeve formed around a transducer that is slid onto a metal ear clip, and a plastic housing that is formed around the transducer and metal ear clip. Both provide a plastic housing encasing an electronic identification transducer that is insulated from the metal ear clip. The plastic housing is securely affixed to the metal ear clip either by a locking mechanism or as a result of being formed around the metal ear clip.

The present invention further contemplates a method for securing an electronic identification device to livestock. In a first step of the method, a metal ear clip 15 is provided having means for self clinching closure, such as an extended tab 36, bubble 28 and raised bridge 30. Next, a housing 16 having a sleeve 18 therein is provided that is sized to fit tightly onto the ear clip 15. The housing 16 includes void means 44 for accessing the self clinching components formed on the ear clip, as well as an electronic transponder 14 positioned therein.

The next step is to slide the plastic housing 16 onto the metal clip 15 until the bubble 28 is visible in the void 44 and so that the self clinching closure is not obstructed by the housing 16.

Next, the combination of the metal clip 15 and housing 16 are positioned near an ear of the livestock, and an ear of the livestock is pierced with the extended tab 36. Closure of the clip 15 next occurs by pushing the two legs 20, 32 of the clip 15 together, causing the extended tab 15 to engage the bubble 28 and be bent under and around the raised bridge 30. This method results in a reliable, durable metal clip being affixed to an animal with an insulated electronic identification device securely fastened thereto without relying upon any plastic retention devices or provisions.

By providing a moldable housing 16, which encases an RFID, which is readily and securely affixed to a one piece metal ear clip having a built-in closing means, the inventor has harnessed the effectiveness of the metal ear clip with the modern data features of an RFID. That is, the superior retention and durability of the one-piece latching metal ear clip, compared to the two piece plastic devices with a post and a locking member, is an advantage of the present invention. However, because it was not practical to construct a small metal housing to enclose the RFID and because of electrical interference from such a housing that could affect the RFID, there was heretofore no way to combine the new RFID data tag with the superior prior art attachment device of the one piece metal tag.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. An electronic identification tag comprising:
a metal ear clip having a first end and a second end;
means for affixing said metal ear clip to an animal, said means for affixing comprising cooperating metal components;
a plastic housing formed around an electronic transponder and substantially around said second end of said metal ear clip, said plastic housing further comprising means for access to said cooperating metal components on said metal ear clip;
wherein said metal ear clip comprises self clinching means comprising a stamped bubble and said plastic housing comprises a void providing access to said bubble.

2. An electronic identification tag comprising:
a one piece metal ear clip having at least one leg, said one piece metal ear clip further comprising means for closing built in to said one piece clip;
a plastic sleeve having an electronic identification device secured in said plastic sleeve wherein said plastic sleeve is attached to said metal ear clip without affecting or impeding said means for closing, said plastic sleeve farther comprising means for access to said closing means, said means for access comprising a void in said sleeve;
means for retaining said plastic sleeve on said at least one leg to prevent translation of said sleeve on said leg, said means for retaining comprising a tight fit of said plastic sleeve onto said leg, said means for retaining further comprising a cooperative locking device between said plastic sleeve and said ear clip preventing translation of said plastic sleeve along said ear clip wherein said cooperative locking device comprises a locking tooth on said leg of said ear clip and a locking void formed in said sleeve.

3. The electronic identification tag as set forth in claim 2 wherein said closing means comprise a stamped bubble and an extended tab locking under a raised bridge and said void in said sleeve comprises a bubble void wherein said stamped bubble is positioned after attachment of said sleeve to said ear clip.

4. A method for securing an electronic identification device to livestock comprising the following steps:
- providing a metal ear clip having means for self clinching closure;
- providing a plastic sleeve sized to fit tightly onto said metal ear clip to prevent translation of said sleeve on said ear clip and to allow access to said means for self clinching closure, said plastic sleeve having an electronic transponder positioned therein;
- sliding said plastic sleeve onto said metal ear clip until said means for self clinching closure is visible and unobstructed by said plastic sleeve;
- placing said metal ear clip near livestock;
- piercing an ear of livestock with a point of said ear clip; and
- closing said means for self clinching closure.

* * * * *